United States Patent [19]

Strickler

[11] Patent Number: 5,141,066
[45] Date of Patent: Aug. 25, 1992

[54] ELECTRONIC WEIGHING APPARATUS HAVING CUSHIONED WEIGHING CELL SUPPORT MEANS

[75] Inventor: Ernst Strickler, Wolfhausen, Switzerland

[73] Assignee: Mettler-Toledo AG, Greifensee, Switzerland

[21] Appl. No.: 698,114

[22] Filed: May 10, 1991

[30] Foreign Application Priority Data

May 23, 1990 [CH] Switzerland .................. 1755/90

[51] Int. Cl.⁵ .................. G01G 7/00; G01G 3/14; G01G 21/28
[52] U.S. Cl. .................. 177/212; 177/210 EMF; 177/244
[58] Field of Search ............. 177/212, 210 EMF, 244

[56] References Cited

U.S. PATENT DOCUMENTS

| | | | |
|---|---|---|---|
| 3,786,884 | 1/1974 | Allenspach. | |
| 4,058,005 | 11/1977 | Barnett | 338/6 X |
| 4,064,744 | 12/1977 | Kistler | 338/6 X |
| 4,090,575 | 5/1978 | Kunz et al. | |
| 4,184,557 | 1/1980 | Kunz. | |
| 4,337,838 | 6/1982 | Kunz. | |
| 4,429,757 | 2/1984 | Kunz. | |
| 4,433,740 | 2/1984 | Luechinger. | |
| 4,489,800 | 12/1984 | Nufer et al. | |
| 4,520,339 | 5/1985 | Utsunomiya | 338/6 X |
| 4,776,414 | 10/1988 | Badcock | 177/211 |
| 4,872,522 | 10/1989 | Kunz. | |

*Primary Examiner*—George H. Miller, Jr.
*Attorney, Agent, or Firm*—Laubscher & Laubscher

[57] ABSTRACT

In order to protectively support the weighing cell of electronic weighing apparatus within a housing and thereby isolate the weighing cell from external impact and shock forces, the weighing cell is mounted on the central portion of the relatively resilient printed circuit board of the electronic load measuring circuitry, which printed circuit board is supported at its edge or corner portions in spaced relation above the bottom wall of the weighing apparatus housing.

5 Claims, 2 Drawing Sheets

ELECTRONIC WEIGHING APPARATUS HAVING CUSHIONED WEIGHING CELL SUPPORT MEANS

STATEMENT OF THE INVENTION

This invention relates to an electronic weighing apparatus wherein the weighing cell means are protectively mounted in a cushioned manner within the housing by mounting the weighing cell on the generally resilient printed circuit board of the associated electronic circuitry.

BRIEF DESCRIPTION OF THE PRIOR ART

Electronic weighing apparatus is well known in the patented prior art, as evidenced, for example, by the prior patents to Allenspach U.S. Pat. No. 3,786,884, Kunz et al U.S. Pat. No. 4,090,575, Kunz U.S. Pat. Nos. 4,429,757 and 4,872,522, Luechinger U.S. Pat. No. 4,433,740 and Nufer et al U.S. Pat. No. 4,489,800.

Electronic weighing scales include a relatively large number of mechanical elements that transmit the force exerted by the weighing material upon the weighing pan before that force can be converted into an electrical signal and can be indicated on load display means. These mechanical components include, for instance, parts, such as levers, flexible bearings, and parallel guide members, that are relatively delicate and have low resistance with respect to, and are little protected against, hard blows and bumps.

During the shipment of the weighing apparatus from the manufacturer to the buyer, it frequently happens that the scale and its packaging are subjected to rough handling, or are even dropped. In this way, there can be damage to mechanical parts in the weighing cell or, at the very least, a new adjustment will have to be made. This entails expenses and additional handling. The present invention seeks to remedy this situation.

SUMMARY OF THE INVENTION

The purpose of the present invention, therefore, is to make the mechanical elements of the scale less sensitive to bumps and blows. This problem is solved according to the invention in that the generally resilient synthetic plastic circuit board carrying associated electronic circuitry is arranged in the housing in spaced relation with respect to the housing and that the weighing cell is fastened thereupon. Thus, with the help of a means that is already present in the scale, that is, the printed circuit board, one can resiliently connect the sensitive mechanical parts of the weighing mechanics within the scale housing and thus protect them against hard blows and bumps, or to attenuate the blows to a harmless degree. The bracing and fastening of the printed circuit board adjacent its edges creates a high degree of resiliency and a relatively large spring excursion for the weighing cell that is fastened in the middle sector of the printing plate. By using the printed circuit board as the resilient element, one can prevent the volume and weight of the scale from becoming bigger.

In accordance with a primary object of he invention, the load cell means of the electronic weighing apparatus is resiliently supported within the housing by means of the printed circuit board of the associated electronic circuitry, which circuit board is supported solely by is edge portions in spaced relation to the bottom wall of the housing.

According to a more specific object, the load cell is supported by spacer means in spaced relation above the printed circuit board, use being made of spacers arranged adjacent the center of the printed circuit board.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
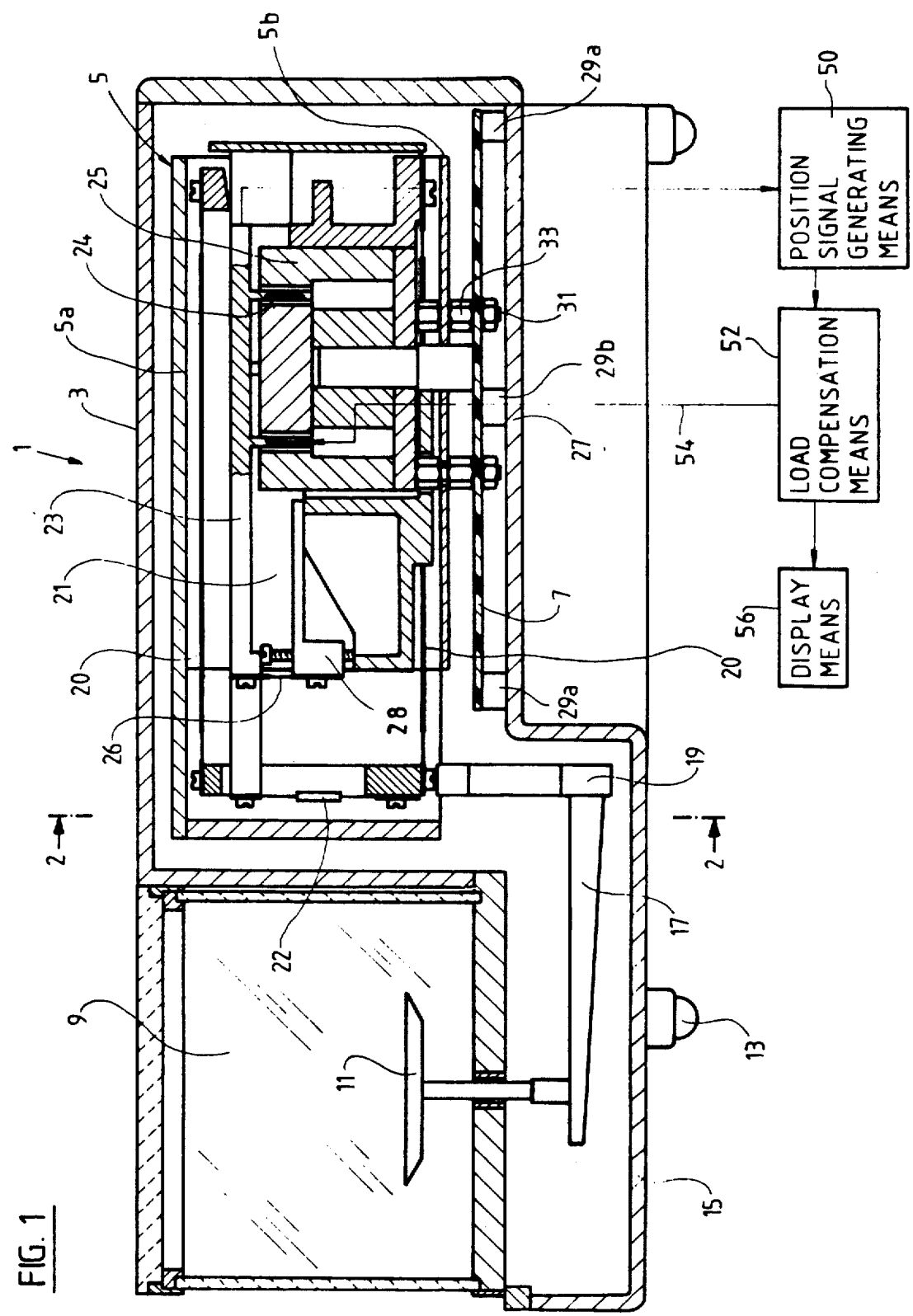
FIG. 1 is a longitudinal sectional view of the electronic weighing apparatus of the present invention.

Referring first more particularly to FIG. 1, the electronic weighing apparatus 1 includes a housing 3 containing a weighing cell 5, which housing also includes a weighing chamber 9 containing a weighing pan 11. The housing includes a base 15 supported by three support feet 13, which base also includes an off-set vertically displaced bottom wall 27. The weighing pan 11 is connected for vertical movement relative to the housing 3 by means of a horizontal support arm 17, and a vertically displaceable load receiver member 19 that is guided for vertical movement by resilient parallel horizontal upper and lower guide members 20, as is known in the art. A transmission lever 23 is supported intermediate its ends by a flexible coupling member 26 that is connected with the vertically adjustable support member 28. At one end, the transmission lever 23 is connected with the load receiver member 19 via coupling member 22, and at its other end, the transmission lever carries the conventional electromagnetic load compensation coil 24 that is arranged for displacement within the annular gap contained within stationary permanent magnet means 25. The electromagnetic load compensation system is well known in the art, as evidenced by the aforementioned U.S. Pat. Nos. 3,786,884, and 4,489,800. Thus, when the transmission lever 23 is pivotally displaced about coupling member 26 upon the application of load to the weighing pan 11, a position responsive signal (produced, for example, by stationary photoelectric cell means) is transmitted to the position signal generating means 50 that supplies a signal to the load compensation means 52 which supplies compensation current to compensation coil 24 via conductor 54, thereby to maintain the transmission lever 23 and coil 24 in the initial no-load position. The amount of the compensation current supplied to the coil 24 is a function of the applied load, as indicated by the display means 56.

Figure 2:
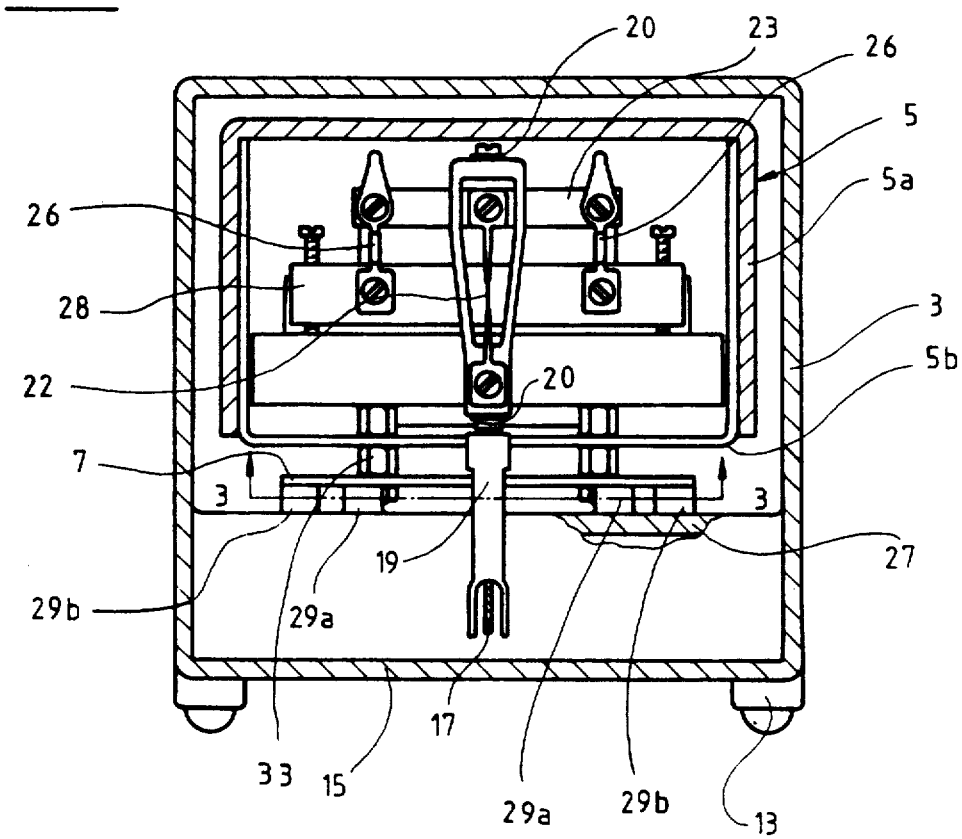
FIG. 2 is a sectional view taken along the line 2—2 of FIG. 1.

In accordance with the characterizing feature of the present invention, the printed circuit board 7—which carries electronic circuitry associated with the weighing system—is supported in spaced relation above the housing bottom wall 27 by support members 29 arranged adjacent the edge portions of the printed circuit board. Thus, first pairs of support members 29a are provided at the ends of the printed circuit board, and intermediate support members 29b are provided at opposite edges of the intermediate portions of the printed circuit board. Thus, the printed circuit board—which is formed of a suitable generally-resilient synthetic plastic material, such as a phenolic resin—is supported solely at its edge portions relative to the bottom wall 27. Connected with the central portion of the printed circuit board by means of bolts 31 is the bottom section 5b of the load cell, which section has a U-shaped configuration as shown in FIG. 2. Spacer sleeves or the like 33 are provided on the bolts to maintain the load cell 5 in spaced relation above the printed circuit board 7. The permanent magnet system is, in turn, bolted to the upper ends of the bolts 31. Thus, the spacer sleeves 33 insure that the weighing cell is connected with the printed circuit board only at the precisely determined fastening locations within the central portion of the printed circuit board, whereby owing to the inherent resiliency of the printed circuit board, the load cell means 5 is resiliently supported in a protected manner relative to the bottom wall 27 of the housing 3. There is no other connection of the weighing cell 5 with the housing 3 or base 15. Furthermore, load receiver 19, which is guided for movement outside of the weighing cell and which carries the support arm 7 and weighing pan 11—is in no place connected with base 15 or housing 3.

Thus, if, as a result of careless shipment, the weighing apparatus 1 is deposited roughly or dropped, the mass of the weighing cell 5—to which the sensitive force transmission and force guidance elements are fastened—is resiliently cushioned in an attenuated manner upon the housing as impact takes place.

According to a further advantage of the invention, the arrangement of the weighing cell on the printed circuit board simultaneously has the benefit of the effect of a mechanical low pass filter. This results in decoupling between the weighing cell and its environment, thereby reducing the effect of any possible disturbing oscillations upon the performance of the scale.

Figure 3:
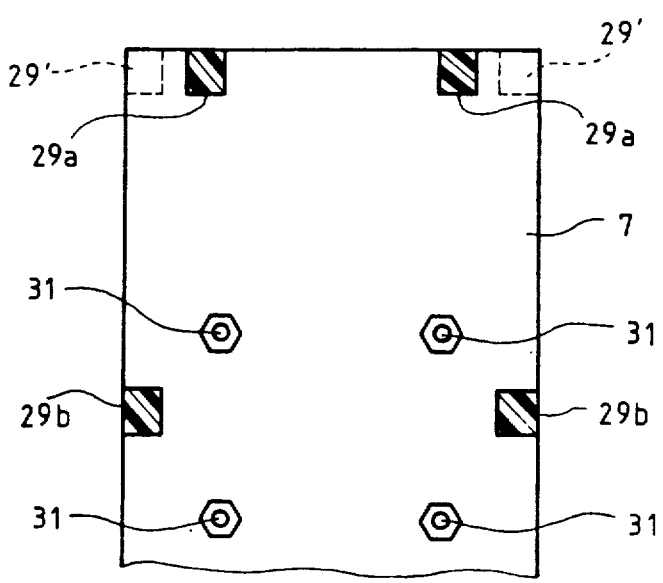
FIG. 3 is a sectional view taken along line 3—3 of FIG. 2.

If desired, the printed circuit board 7 could be supported solely by four supports 29' arranged at its corners, as shown in phantom in FIG. 3. Thus, omitting the intermediate supports 29b considerably improves the damping characteristic with respect to blows and bumps, resulting in improved protection of the mechanical components. On the other hand, with supports 29b omitted, a different sensitivity to vibrations affecting the operation of the balance will result. Thus, in practice, the number and positioning of supports 29, as well as the positioning of the connecting bolts 31, is a compromise depending on the respective circumstances and demands on the performance of the scale.

While, in accordance with the provisions of the Patent Statutes, the preferred form an embodiment of the invention has been illustrated and described, it will be apparent that various changes and modifications may be made in the apparatus described without deviating from the inventive concepts set forth above.

What is claimed is:

1. Electronic weighing apparatus, comprising:
   (a) a housing (3) including a base (15) having a bottom wall (27), said housing containing a weighing chamber (9);
   (b) load receiving means including a weighing pan arranged in said chamber, and means (17, 19, 20) connecting said weighing pan for movement relative to said housing; and
   (c) electronic load measuring means for producing a load-responsive signal as a function of a load applied to said weighing pan, said load measuring means including:
      (1) at least one printed circuit board (7) arranged within said housing;
      (2) first support means (29) supporting said printed circuit board in spaced relation above said housing bottom wall; and
      (3) weighing cell means (5) supported within said housing by said printed circuit board.

2. Apparatus as defined in claim 1, wherein said support means supports said printed circuit board solely at its edge portions.

3. Apparatus as defined in claim 1, wherein said support means supports said printed circuit board at its corners.

4. Apparatus as defined in claim 1, and further including means (31) connecting said weighing cell means with at least two central portions of said printed circuit board remote from the edges thereof.

5. Apparatus as defined in claim 4, wherein said weighing cell connecting means comprise support means (33) supporting said weighing cell means in spaced relation above said printed circuit board.

* * * * *